United States Patent
Sakamoto et al.

(10) Patent No.: US 12,110,242 B2
(45) Date of Patent: Oct. 8, 2024

(54) SLUDGE DEHYDRATING AGENT AND SLUDGE DEHYDRATION METHOD

(71) Applicant: KURITA WATER INDUSTRIES LTD., Tokyo (JP)

(72) Inventors: Ayako Sakamoto, Tokyo (JP); Shigeru Sato, Tokyo (JP); Kazuya Watanabe, Tokyo (JP); Shihoko Sekiguchi, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 466 days.

(21) Appl. No.: 17/603,586

(22) PCT Filed: Mar. 13, 2020

(86) PCT No.: PCT/JP2020/011232
§ 371 (c)(1),
(2) Date: Oct. 14, 2021

(87) PCT Pub. No.: WO2020/217772
PCT Pub. Date: Oct. 29, 2020

(65) Prior Publication Data
US 2023/0096219 A1   Mar. 30, 2023

(30) Foreign Application Priority Data
Apr. 24, 2019 (JP) ................ 2019-082999

(51) Int. Cl.
| | | |
|---|---|---|
| *C02F 11/147* | (2019.01) | |
| *B01D 21/01* | (2006.01) | |
| *C02F 1/56* | (2023.01) | |
| *C08F 220/34* | (2006.01) | |
| *C08F 220/38* | (2006.01) | |

(52) U.S. Cl.
CPC ............ *C02F 11/147* (2019.01); *B01D 21/01* (2013.01); *C02F 1/56* (2013.01); *C08F 220/34* (2013.01); *C08F 220/385* (2020.02); *C08F 2800/10* (2013.01)

(58) Field of Classification Search
CPC .......... C02F 11/147; C02F 1/56; B01D 21/01; C08F 220/34; C08F 220/385; C08F 2800/10
See application file for complete search history.

(56) References Cited

FOREIGN PATENT DOCUMENTS

| | | |
|---|---|---|
| CN | 102786131 | 11/2012 |
| JP | 2005144346 | 6/2005 |
| JP | 2009280649 | 12/2009 |
| JP | 2011224420 | 11/2011 |
| JP | 2012170853 | 9/2012 |
| JP | 2012254430 | 12/2012 |
| JP | 2018001047 | 1/2018 |
| JP | 2018149531 | 9/2018 |
| JP | 2020025939 | 2/2020 |
| WO | 2008015769 | 2/2008 |
| WO | 2014030588 | 2/2014 |
| WO | 2018168447 | 9/2018 |

OTHER PUBLICATIONS

"International Search Report (Form PCT/ISA/210) of PCT/JP2020/011232", mailed on Jun. 2, 2020, with English translation thereof, pp. 1-5.
"Search Report of Europe Counterpart Application", issued on May 18, 2022, pp. 1-6.
"Office Action of Taiwan Counterpart Application", issued on Mar. 10, 2023, with English translation thereof, pp. 1-8.

*Primary Examiner* — Thuan D Dang
(74) *Attorney, Agent, or Firm* — JCIPRNET

(57) ABSTRACT

Provided are: a sludge dehydrating agent which can exert a steady dehydrating effect on various types of sludge and has excellent dehydration performance; and a sludge dehydration method using the sludge dehydrating agent. The sludge dehydrating agent of the present invention with a polymer which has a constituent unit derived from a cationic monomer, wherein a value k determined from an intrinsic viscosity [η] 1 [dL/g] of a 1-mol/L aqueous sodium nitrate solution of the polymer at 30° C. and an intrinsic viscosity [η] 0.01 [dL/g] of a 0.01-mol/L aqueous sodium nitrate solution of the polymer at 30° C. in accordance with formula (I) is 0.8 to 2.2 exclusive $$k=([\eta]0.01-[\eta]1)/9 \qquad (I).$$

4 Claims, No Drawings

SLUDGE DEHYDRATING AGENT AND SLUDGE DEHYDRATION METHOD

CROSS-REFERENCE TO RELATED APPLICATION

This application is a 371 application of an international PCT application serial no. PCT/JP2020/011232, filed on Mar. 13, 2020, which claims the priority benefit of Japan application JP2019-082999, filed on Apr. 24, 2019. The entirety of each of the above-mentioned patent applications is hereby incorporated by reference herein and made a part of this specification.

TECHNICAL FIELD

The present invention relates to a sludge dehydrating agent suitable for a dehydration treatment of sludge, particularly, sludge that is difficult to dehydrate and a sludge dehydration method using the sludge dehydrating agent.

BACKGROUND ART

As sludge dehydrating agents that are used for dehydration treatments of sludge, mainly, excess sludge or the like generated in food factories, chemical factories, night soil treatment plants, and the like, ordinarily, cationic polymer flocculants are in use. However, recently, in association with the diversification of sludge such as an increase in the amount of sludge generated or a change in natures, the amount of sludge that is difficult to dehydrate also has increased, and sludge dehydrating agent with better dehydration performance such as gravity filterability is desired.

Conventionally, as sludge dehydrating agents for which a cationic polymer flocculant is used, dimethylaminoethyl (meth)acrylate, quaternized methyl chlorides thereof, and the like have been mainly used. However, in order for additional improvement in dehydration performance, recently, various sludge dehydrating agents other than such cationic polymer flocculants have been proposed.

For example, Patent Literature 1 describes the use of an ionic water-soluble polymer in which a water-in-oil emulsion (W/O emulsion)-like liquid is dried and granulated and the charge inclusion rate is 35% to 90% for dehydration of sludge.

Patent Literature 2 and 3 describe the use of a flocculation treatment agent in which two crosslinking water-soluble ionic polymers having a high charge inclusion rate and a low charge inclusion rate, respectively, are combined for dehydration of sludge.

In addition, Patent Literature 4 discloses a sludge dehydrating agent for which a mixture of an amidine-based polymer, a crosslinking cationic polymer, and a non-crosslinking cationic polymer is used.

Patent Literature 5 describes a sludge dehydrating agent for which a mixture of a plurality of polymers containing a (meth)acrylate-based cationic polymer that has been turned into quaternary ammonium with an alkylating agent having 7 or more carbon atoms is used.

CITATION LIST

Patent Literature

Patent Literature 1

Japanese Patent Laid-Open No. 2009-280649

Patent Literature 2

Japanese Patent Laid-Open No. 2005-144346

Patent Literature 3

International Publication WO 2008/015769

Patent Literature 4

Japanese Patent Laid-Open No. 2011-224420

Patent Literature 5

Japanese Patent Laid-Open No. 2012-254430

SUMMARY OF INVENTION

Technical Problem

However, in a case where the conventional sludge dehydrating agents described above were used, flocculated flocs to be formed became small, adjustment of the mixing balance between two active agents was cumbersome, and the like, which made it impossible to efficiently perform dehydration treatments of sludge at all times.

In addition, conventionally, it was considered that sludge dehydration performance significantly depends on the cation degree of a polymer in a sludge dehydrating agent and a high cation degree leads to high charge neutralizing power and excellent dehydration performance.

However, in association with the recent diversification of sludge described above, there have been cases where the dehydration effect significantly varied depending on a difference in a nature such as the electrical conductivity of sludge or the concentration of an organic substance, and there also have been cases where sludge dehydrating agents having an increased cation degree cannot be said to have favorable dehydration performance at all times.

In addition, in Patent Literature 3, the crosslinking polymer in the sludge dehydrating agent becomes a hard structure and is capable of forming solid flocculated flocs. On the other hand, when the structure becomes hard, the spread of polymer chain in water is suppressed, which impairs flocculation, and there is a problem in that it is necessary to increase the amount of the sludge dehydrating agent added for sludge treatment.

However, for polymers in sludge dehydrating agents, the relationship between the spread of a polymer chain in water or hardness and sludge dehydration performance has not yet been sufficiently clarified. In addition, at the moment, almost no studies have been performed from the viewpoint of the physical properties of polymers that serve as an index of the spread of a polymer chain or hardness.

Therefore, the present inventors paid attention to the rigidity of polymers regarding the spread of a polymer chain and found a sludge dehydrating agent having superior dehydration performance to conventional sludge dehydrating agents as a result of studying the relationship between the rigidity of polymers and the dehydration performance of sludge dehydrating agents.

The present invention has been made under such situations, and an objective of the present invention is to provide a sludge dehydrating agent which can exert a steady dehydrating effect on various types of sludge and has excellent dehydration performance and a sludge dehydration method using the sludge dehydrating agent.

Solution to Problem

The present invention is based on a finding that, when a parameter correlating with the rigidity of a polymer satisfies a predetermined condition, the polymer has excellent sludge dehydration performance and exerts a steady dehydrating effect on various types of sludge.

That is, the present invention provides [1] to [5] below.

[1] A sludge dehydrating agent with a polymer which has a constituent unit derived from a cationic monomer, in which a value k determined from an intrinsic viscosity $[\eta]_1$ [dL/g] of a 1-mol/L aqueous sodium nitrate solution of the polymer at 30° C. and an intrinsic viscosity $[\eta]_{0.01}$ [dL/g] of a 0.01-mol/L aqueous sodium nitrate solution of the polymer at 30° C. in accordance with formula (I) is 0.8 to 2.2 exclusive.

$$k=([\eta]_{0.01}-[\eta]_1)/9 \qquad (I)$$

[2] The sludge dehydrating agent according to [1], in which the intrinsic viscosity $[\eta]_1$ is 1.0 to 6.5 dL/g.
[3] The sludge dehydrating agent according to [1] or [2], in which the polymer is a crosslinking polymer of a cationic monomer represented by formula (1) or a crosslinking copolymer of the cationic monomer represented by formula (1) and a non-ionic monomer, and a proportion of the cationic monomer is 30 mol % or more in a total of 100 mol % of monomers that serve as constituent units of the polymer.

[Chem. 1]

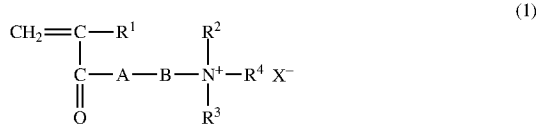

(1)

(In formula (1), $R^1$ is a hydrogen atom or a methyl group, $R^2$ and $R^3$ are each independently a hydrogen atom or an alkyl group having 1 to 3 carbon atoms, and $R^4$ is a hydrogen atom, an alkyl group having 1 to 3 carbon atoms, or a benzyl group. A is an oxygen atom or an imino group, and B is an alkylene group having 2 to 4 carbon atoms.
$X^-$ is a negative ion.)
[4] The sludge dehydrating agent according to any one of [1] to [3], in which the polymer is a water-in-oil emulsion type.
[5] A sludge dehydration method in which sludge is dehydrated by adding the sludge dehydrating agent according to any one of [1] to [4] to the sludge.

Advantageous Effects of Invention

The sludge dehydrating agent of the present invention has excellent sludge dehydration performance and can exert a steady dehydrating effect on various types of sludge. Therefore, according to the sludge dehydration method of the present invention in which the sludge dehydrating agent is used, it is possible to steadily and efficiently perform a dehydration treatment on various types of sludge.

DESCRIPTION OF EMBODIMENTS

Hereinafter, a sludge dehydrating agent of the present invention and a sludge dehydration method using the sludge dehydrating agent will be described in detail.

In the present specification, "(meth)acryl" means acryl and/or methacryl, which is also true for the expressions of "(meth)acrylate" and "(meth)acrylolyl".

Sludge Dehydrating Agent

A sludge dehydrating agent of the present invention with a polymer which has a constituent unit derived from a cationic monomer. In addition, a value k determined from an intrinsic viscosity $[\eta]_1$ [dL/g] of a 1-mol/L aqueous sodium nitrate solution of the polymer at 30° C. and an intrinsic viscosity $[\eta]_{0.01}$ [dL/g] of a 0.01-mol/L aqueous sodium nitrate solution of the polymer at 30° C. in accordance with formula (I) is 0.8 to 2.2 exclusive.

$$k=([\eta]_{0.01}-[\eta]_1)/9 \qquad (I)$$

The sludge dehydrating agent contains a polymer having a k value, which is a parameter correlating with the rigidity of the polymer, within a predetermined numerical range and thereby has excellent sludge dehydration performance.

<k Value>

The dehydration performance of the sludge dehydrating agent is considered to be related to the spread state of a polymer chain of the ionic polymer in the sludge dehydrating agent, and, in the present invention, a k value is adopted as a parameter based on the intrinsic viscosity that is a physical property of a polymer which correlates with the degree of the spread or contraction of a polymer chain, that is, the rigidity of the polymer.

It is known that, when the intrinsic viscosity $[\eta]$ of the ionic polymer is measured using a plurality of solvent specimens having different ionic strengths I for a predetermined solvent and plotted in a graph where the vertical axis indicates $[\eta]$ and the horizontal axis indicates $I^{-1/2}$, a straight-line relationship is obtained (refer to "Journal of Polymer Science" 1959, Vol. 37, Issue 132, pp. 375 to 383). The slope of this straight line is considered to correlate with the rigidity of the polymer.

It can be said that, as the slope of the straight line becomes smaller, the intrinsic viscosity of the ionic polymer is more unlikely to be affected by the ionic strength. That is, it can be said that, as the slope becomes smaller, the polymer becomes more solid such that the spread of the polymer chain does not depend on the ionic strength.

In the present invention, from the viewpoint of convenience in the design or selection of the polymer, the slope of a straight line based on two intrinsic viscosities of the intrinsic viscosity $[\eta]_1$ of a 1-mol/L aqueous sodium nitrate solution of the polymer at 30° C. and the intrinsic viscosity $[\eta]_{0.01}$ of a 0.01-mol/L aqueous sodium nitrate solution of the polymer at 30° C. is regarded as the k value. Since the ionic strength of the 1-mol/L aqueous sodium nitrate solution is 1 and the ionic strength of the 0.01-mol/L aqueous sodium nitrate solution of the polymer is 0.01, the formula (I) is derived by the following calculation.

$$k = ([\eta]_{0.01} - [\eta]_1)/(0.01^{-1/2} - 1^{-1/2}) \qquad (I)$$
$$= ([\eta]_{0.01} - [\eta]_1)/9$$

The 0.01-mol/L aqueous sodium nitrate solution is almost equal to the electrical conductivity of ordinary sludge, and the intrinsic viscosity $[\eta]_{0.01}$ serves as a rough standard that indicates the spread of the polymer chain in sludge.

On the other hand, the intrinsic viscosity $[\eta]_1$ of the 1-mol/L aqueous sodium nitrate solution serves as a rough standard that indicates a change in the spread of the polymer chain in association with a change in the ionic strength of the external environment.

The k value is 0.8 to 2.2 exclusive, preferably 0.9 to 2.1 exclusive, and more preferably 1.0 to 2.0.

As the k value becomes smaller, the polymer can be said as a solid polymer that is more unlikely to be affected by the ionic strength of the external environment. Conversely, as the k value becomes larger, the polymer can be said as a soft polymer in which the polymer chain is more likely to be stretched or contracted.

When the k value is 0.8 or less, the rigidity of the polymer is too high, the spread of the polymer chain is small, an opportunity of the polymer coming into contact with sludge particles is suppressed, adsorption of the polymer to the sludge particles becomes insufficient, and favorable sludge dehydration performance cannot be obtained. On the other hand, when the k value is 2.2 or more, the polymer is too soft, the polymer cannot be firmly adsorbed to the sludge particles, and, in this case as well, favorable sludge dehydration performance cannot be obtained.

Intrinsic Viscosity

The intrinsic viscosity [η] is a physical property of the polymer that serves as an index of the degree of the spread or contraction of the polymer chain as described above.

The intrinsic viscosity [η] tends to increase as the molecular weight of the polymer increases and can also serve as a tentative rough standard for the molecular weight. Here, the intrinsic viscosity [η] also depends on the structure, polymerization conditions, or the like of a monomer that serves as a constituent unit of the polymer and does not necessarily correspond to the magnitude of the molecular weight at all times.

As described above, the intrinsic viscosity $[\eta]_1$ serves as a rough standard that indicates a change in the spread of the polymer chain in association with a change in the ionic strength of the external environment and is preferably 1.0 to 6.5 dL/g, more preferably 1.5 to 5.0 dL/g, and still more preferably 1.7 to 4.9 dL/g.

As long as the intrinsic viscosity $[\eta]_{0.01}$ of the polymer is within the above-described range, the polymer chain is capable of appropriately spreading in various types of sludge, and the k value is likely to satisfy the above-described desired numerical range.

The intrinsic viscosity $[\eta]_{0.01}$ can be specified from the relationship between the k value and the intrinsic viscosity $[\eta]_1$ and is preferably 8.5 to 26.0 dL/g, more preferably 9.5 to 23.5 dL/g, and still more preferably 10.0 to 23.0 dL/g.

In the present invention, the intrinsic viscosity [η] is defined as a value calculated using the Huggins equation shown in formula (II).

$$\eta_{sp}/C=[\eta]+k'[\eta]2C \quad (II)$$

In the formula (II), $\eta_{sp}$ represents the specific viscosity ($=\eta_{rel}-1$), k' represents the Huggins constant, C represents the polymer concentration, and $\eta_{rel}$ represents the relative viscosity.

The Huggins constant k' is a constant that is specified by the kind of the polymer or the kind of a solvent, but can be determined as a slope at the time of plotting the intrinsic viscosity in a graph where the vertical axis indicates $\eta_{sp}/C$ and the horizontal axis indicates C as is clear from the formula (II). Specifically, a plurality of polymer solution specimens having different polymer concentrations is prepared, the specific viscosity $\eta_{sp}$ of the polymer solution specimen having each concentration is determined and plotted in a graph where the vertical axis indicates $\eta_{sp}/C$ and the horizontal axis indicates C, and the value of the intercept at the time of extrapolating C to zero is the intrinsic viscosity [η].

The specific viscosity $\eta_{sp}$ can be determined by a method shown in examples described below.

Polymer

The sludge dehydrating agent of the present invention with a polymer which has a constituent unit derived from a cationic monomer.

The monomer that serves as the constituent unit of the polymer is necessarily a cationic monomer, and a non-ionic monomer and/or an anionic monomer may be further included. From the viewpoint of adjusting the k value to be within a predetermined numerical range, the monomer is preferably a cationic monomer alone or a cationic monomer and a non-ionic monomer.

Cationic Monomer

As the cationic monomer, a compound represented by formula (1) is preferable.

[Chem. 2]

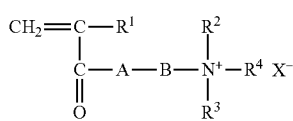

(1)

In the formula (1), $R^1$ is a hydrogen atom or a methyl group.

$R^2$ and $R^3$ are each independently a hydrogen atom or an alkyl group having 1 to 3 carbon atoms and preferably an alkyl group having 1 to 3 carbon atoms.

$R^4$ is a hydrogen atom, an alkyl group having 1 to 3 carbon atoms, or a benzyl group and preferably a hydrogen atom or an alkyl group having 1 to 3 carbon atoms.

A is an oxygen atom or an imino group, and B is an alkylene group having 2 to 4 carbon atoms.

$X^-$ is a negative ion and preferably a chlorine ion, a bromine ion, an iodine ion, ½·$SO_4^-$, $HSO_4^-$, or $CH_3SO_4^-$.

Examples of the cationic monomer include (meth)acryloyloxyalkyl quaternary ammonium salts such as 2-((meth)acryloyloxy)ethyltrimethylammonium chloride and 2-((meth)acryloyloxy)ethyldimethylbenzylammonium chloride; 2-((meth)acryloyloxy)ethyldimethylamine sulfate or hydrochloride, (meth)acryloyloxyalkyl tertiary amine salts such as 3-((meth)acryloyloxy)propyldimethylamine hydrochloride; (meth)acryloylaminoalkyl quaternary ammonium salts such as 3-((meth)acryloylamino)propyltrimethylammonium chloride and 3-((meth)acryloylamino)propyltrimethylammonium methyl sulfate, and the like. One cationic monomer may be used singly or two or more cationic monomers may be jointly used.

Among the above-described cationic monomers, from the viewpoint of the polymerizability, sludge dehydration performance, or the like, (meth)acryloyloxyalkyl quaternary ammonium salts and (meth)acryloyloxyalkyl tertiary amine salts are preferable, 2-((meth)acryloyloxy)ethyltrimethylammonium chloride and 2-((meth)acryloyloxy)ethyldimethylamine sulfate are more preferable, and 2-(acryloyloxy) ethyltrimethylaminium chloride is still more preferable.

Non-Ionic Monomer

Examples of the non-ionic monomer include amides such as (meth)acrylamide and N,N-dimethyl (meth)acrylamide; vinyl cyanide-based compounds such as (meth)acrylonitrile; (meth)acrylic acid alkyl esters such as methyl (meth)acrylate and ethyl (meth)acrylate; vinyl esters such as vinyl acetate; aromatic vinyl-based compounds such as styrene, α-methylstyrene, and p-methylstyrene; and the like. One non-ionic monomer may be used singly or two or more non-ionic monomers may be jointly used.

Among the above-described non-ionic monomers, amides are preferable, (meth)acrylamide is more preferable, and acrylamide is still more preferable since the water solubility is excellent, adjustment of the compositional ratio of monomers in the polymer is easy, favorable sludge dehydration performance can be easily obtained, and the like.

Anionic Monomer

Examples of the anionic monomer include vinyl sulfonic acid, vinylbenzene sulfonic acid, 2-acrylamide-2-methylpropanesulfonic acid, (meth)acrylic acid, itaconic acid, maleic acid, alkali metal salts thereof, and the like. One anionic monomer may be used singly or two or more anionic monomers may be jointly used.

The polymer is preferably a crosslinking polymer of the cationic monomer represented by the formula (1) or a crosslinking copolymer of the cationic monomer represented by the formula (1) and a non-ionic monomer. In addition, in the crosslinking copolymer, the proportion of the cationic monomer in a total of 100 mol % of the monomers that serve as the constituent units of the polymer is preferably 30 mol % or more, more preferably 35 to 95 mol %, and still more preferably 40 to 90 mol %.

When the polymer is a crosslinking polymer which has a constituent unit derived from such a cationic monomer, a polymer having a k value within a predetermined numerical range can be easily obtained.

It is thought that when crosslinked, the polymer becomes rigid and becomes a structure that is not easily distorted, and the polymer strongly bonds to some of the active surfaces of the sludge particles instead of covering all of the surfaces of the sludge particles. Different polymer molecules bond to the remaining active surfaces, as a result, a high-density bond is formed between the sludge particles, and it becomes possible to form solid flocculated flocs capable of withstanding strong shearing such as stirring.

In the present invention, the composition ratio of the monomers blended at the time of polymerizing the polymer is regarded as the compositional ratio of the monomers that serve as the constituent units of the polymer.

The crosslinking polymer or the crosslinking copolymer is manufactured using a crosslinking agent during polymerization as necessary.

Examples of the crosslinking agent include N,N'-methylenebis (meth) acrylamide, triallylamine, ethylene glycol di (meth) acrylate, polyethylene glycol di (meth) acrylate, 1,3-butylene glycol di (meth) acrylate, ethoxylated isocyanurate tri (meth) acrylate, and the like. One crosslinking agent may be used singly or two or more crosslinking agents may be jointly used.

Among these crosslinking agents, N,N'-methylenebis (meth) acrylamide, triallylamine, and ethoxylated isocyanurate tri (meth) acrylate are preferable, N,N'-methylenebisacrylamide, triallylamine, and ethoxylated isocyanurate triacrylate are more preferable, and N,N'-methylenebisacrylamide is still more preferable since it is easy to adjust the k value of a polymer to be obtained to be within a predetermined numerical range.

The monomers that serve as the constituent units of the polymer mentioned in the present invention do not include the crosslinking agent.

In the sludge dehydrating agent, one type of polymer may be used or two or more types of polymers may be jointly used. For example, in a case where two types are contained, the sludge dehydrating agent may be a one-dosage form in which the individual polymers are mixed together or a two-dosage form in which the individual polymers are made into separate liquids and the liquids are jointly used at the time of using the sludge dehydrating agent.

The sludge dehydrating agent may contain, in addition to the polymer, for example, a different component such as sulfamic acid, sodium sulfate, or sodium hydrogen sulfate, a solvent, and the like as long as the effect of the present invention is not impaired. Here, the content of the different component is preferably 10 mass % or less, more preferably 5 mass % or less, and still more preferably 0 mass % in 100 mass % of the sludge dehydrating agent.

The solvent is used to allow the polymer to be present in the sludge dehydrating agent at an appropriate concentration and can be contained in order to maintain the polymer in a steady and uniform state and from the viewpoint of easiness in handling the sludge dehydrating agent or the like. The solvent is usually water, but examples thereof include organic solvents such as a lipid solvent attributed to a method for manufacturing the polymer described below and the like.

In a case where the sludge dehydrating agent contains such a water-in-oil emulsion (W/O emulsion)-type polymer as described below, the polymer concentration in the sludge dehydrating agent is preferably 30 to 60 mass %, more preferably 32 to 55 mass %, and still more preferably 35 to 50 mass %. At the time of being used, the sludge dehydrating agent may be appropriately diluted with a solvent such as water such that the polymer becomes a predetermined concentration depending on the natures or the like of sludge to be added, thereby preparing an agent-added liquid.

Method for Manufacturing Polymer

The polymer can be manufactured by polymerizing monomers that serve as the constituent units of the polymer, a polymerization initiator, and, as necessary, a crosslinking agent.

Polymerization Initiator

Examples of the polymerization initiator that is used for the polymerization of the polymer include persulfates such as ammonium persulfate and potassium persulfate; organic oxides such as benzoyl peroxide; azo-based compounds such as azobisisobutyronitrile, azobiscyanovaleric acid, 2,2'-azobis(2-amidinopropane) dihydrochloride, 2,2'-azobis(2,4-dimethylvaleronitrile), 2,2'-azobis(4-methoxy-2,4-dimethylvaleronitrile), 2,2'-azobis(2-methylamidinopropane) dihydrochloride, 2,2'-azobis(2-methylpropionamidine) dihydrochloride, and 2,2'-azobis[2-(2-imidazolin-2-yl)propane] dihydrochloride; and the like. One polymerization initiator may be used singly or two or more polymerization initiators may be jointly used.

The amount of the polymerization initiator added can be appropriately set depending on the composition or the like of the monomers that serve as the constituent units of the polymer, but is usually approximately 0.01 to 0.5 parts by mass with respect to 100 parts by mass of the total mass of the monomers.

Crosslinking Agent

The crosslinking agent can be used as necessary in order to manufacture the crosslinking polymer or the crosslinking copolymer.

In the case of using the crosslinking agent, the kind and amount of the crosslinking agent added are appropriately adjusted depending on a desired k value of the polymer. While also depending on the kind of the crosslinking agent, other polymerization conditions, and the like, as the amount of the crosslinking agent added with respect to the total mass of the monomers that serve as the constituent units of the polymer increases, the k value tends to decrease. The amount of the crosslinking agent added is usually approximately 5 to 500 mass ppm, preferably 10 to 400 mass ppm, and more preferably 15 to 300 mass ppm with respect to the total mass of the monomers.

Polymerization Method

Examples of the aspect of the polymerization method include an emulsion polymerization method, an aqueous solution polymerization method, a suspension polymerization method, and the like. Among these polymerization methods, the emulsion polymerization method by which the polymer is obtained in a W/O emulsion type is preferable from the viewpoint of easiness in manufacturing, easiness in handling the manufactured polymer as a sludge dehydrating agent, solubility in sludge, or the like.

As the emulsion polymerization method, a well-known method can be used. For example, an oil phase containing a lipid solvent and a surfactant is prepared, an aqueous solution of monomers that serve as the constituent units of the polymer is added to the oil phase, stirred, and mixed, and the mixture is polymerized by emulsification. In a case where the polymerization initiator is water-soluble, the polymerization initiator may be mixed into an aqueous solution of the polymer in advance, and, in a case where the polymerization initiator is oil-soluble, the polymerization initiator may be added after emulsification.

As the lipid solvent, it is possible to use, for example, a mineral oil such as kerosene or light oil or a refined product of the mineral oil such as normal paraffin, isoparaffin, or naphthenic oil, and it is also possible to use a synthetic oil, a vegetable oil, an animal oil each having the same natures as the above-described lipid solvents, or a mixture thereof.

As the surfactant, for example, a non-ionic surfactant such as a sorbitan fatty acid ester such as sorbitan monooleate or sorbitan monostearate; a polyoxyethylene alkyl ether such as polyoxyethylene lauryl ether or pentaoxyethylene oleyl ether is preferably used.

At the time of determining the k value, a polymer solution specimen that is used for the measurement of the intrinsic viscosity can be prepared by immediately diluting the W/O emulsion-type polymer obtained as described above with water and an aqueous sodium nitrate solution having a predetermined concentration. As described above, the W/O emulsion-type polymer does not require any post treatment such as the purification of the polymerized polymer, and thus it is possible to simplify the manufacturing operation of the polymer.

While the W/O emulsion-type polymer is obtained in a state of containing the lipid solvent, the polymer solution specimen that is used for the measurement of the intrinsic viscosity is prepared by diluting the W/O emulsion-type polymer with a large amount of water and an aqueous sodium nitrate solution, and thus it is possible to ignore the presence of the lipid solvent. Therefore, in the present invention, the intrinsic viscosity of the W/O emulsion-type polymer is also regarded as the intrinsic viscosity of the polymer measured using the aqueous sodium nitrate solution as a solvent.

A process of making the manufactured polymer into a solid form by a post treatment such as drying or crushing and then dissolving the polymer to prepare a solution in order for the measurement of the intrinsic viscosity makes operation cumbersome, furthermore, causes the rigidity of the polymer to change due to shearing or the like generated during heating or crushing for the post treatment, and makes it impossible to steadily obtain polymers having a desired k value in some cases. Therefore, from the practical viewpoint of a sludge dehydrating agent that is added to and used in sludge in a liquid form, the polymer is preferably a W/O emulsion type that can be rapidly and conveniently prepared as a sludge dehydrating agent by being diluted with water.

Sludge Dehydration Method

A sludge dehydration method of the present invention is a method in which sludge is dehydrated by adding the sludge dehydrating agent to the sludge.

Examples of sludge that is an application target of the sludge dehydration method include excess sludge of sewage, mixed raw sludge, digestive sludge, excess sludge or coagulated mixed sludge from food factories, chemical factories, or the like, mixed sludge from night soil treatment plants, and the like.

According to the sludge dehydration method in which the sludge dehydrating agent of the present invention is used, it is possible to steadily and efficiently perform a dehydration treatment on various types of sludge.

For example, in a case where the content of suspended solids (SS) in sludge is approximately 0.4 to 40 mass %, the amount of the sludge dehydrating agent added is preferably 20 to 1600 mg/L, more preferably 30 to 1200 mg/L, and still more preferably 50 to 800 mg/L.

The content of SS mentioned herein is a value determined by an analysis method described in the examples described below.

The method for adding the sludge dehydrating agent to sludge is not particularly limited, and a well-known method can be applied. For example, it is possible to dilute the sludge dehydrating agent with a solvent such as water such that the polymer in the sludge dehydrating agent becomes a predetermined concentration and then add the sludge dehydrating agent to sludge.

The concentration of the polymer in the agent-added liquid at the time of adding the sludge dehydrating agent is preferably 0.01 to 1.0 mass %, more preferably 0.03 to 0.6 mass %, and still more preferably 0.05 to 0.4 mass % from the viewpoint of uniformly dispersing the polymer in the sludge.

The sludge to which the sludge dehydrating agent has been added is capable of forming flocculated flocs by, for example, being stirred with a stirring blade in a flocculation reaction tank under predetermined stirring conditions (for example, at 180 rpm for 30 seconds).

In addition, a dehydration treatment is performed on the flocculated flocs with a dehydrator, and solid and liquid are separated, thereby obtaining dehydrated cake.

The dehydrator is not particularly limited, and examples thereof include a belt press filter, a screw press dehydrator, a multiple disk-type dehydrator, a centrifugal dehydrator, and the like.

The dehydrated cake is landfilled or reused as gardening soil or cement raw materials.

From the viewpoint of making the dehydrated cake easy to handle during transportation, disposal, reuse, and the like, it is preferable that the massive cake shape does not collapse and the amount of moisture contained is as small as possible. According to the sludge dehydration method of the present invention, it is possible to obtain such dehydrated cake having favorable handleability.

In the sludge dehydration method of the present invention, it is possible to steadily and efficiently perform a dehydration treatment on various types of sludge by using the sludge dehydrating agent of the present invention; however, in addition to the sludge dehydrating agent of the present invention, a different sludge dehydrating agent containing a polymer different from the polymer in the sludge dehydrating agent may be jointly used. Examples of the polymer in the different sludge dehydrating agent that is jointly used include a polymer having a cationic functional group or an anionic polymer. The polymer having a cationic functional group includes not only cationic polymers but also ampholytic polymers. In addition, these polymers may be a crosslinking-type polymer or a non-crosslinking-type polymer such as a linear polymer.

The different sludge dehydrating agent is also preferably added by the same addition method as in the addition of the sludge dehydrating agent of the present invention.

EXAMPLES

Hereinafter, the present invention will be described based on examples, but the present invention is not limited to the following examples.

Various polymers were prepared, and evaluation tests of sludge dehydrating agent specimens in which the polymers were used were performed.

Preparation of Polymers

Various polymers that were used for the sludge dehydrating agent specimens of the following examples and comparative examples were prepared as in individual synthesis examples described below or from commercially available products.

Individual constituent monomers of the individual polymers are abbreviated as follows.

DAA: 2-(Acryloyloxy)ethyltrimethylammonium chloride; molecular weight: 193.7
DAM-1: 2-(Methacryloyloxy)ethyldimethylammonium chloride; molecular weight: 207.7
DAM-2: 2-(Methacryloyloxy)ethyldimethylamine sulfate; molecular weight: 266.3
AAM: Acrylamide; molecular weight: 71.1
AA: Acrylic acid; 72.1

Synthesis Example 1

Normal paraffin (301 g), pentaoxyethylene oleyl alcohol ether (40 g), and sorbitan monooleate (12 g) were charged into a 1 L four-neck separable flask including a stirrer, a cooling pipe, a nitrogen introduction pipe, and a thermometer, stirred, and mixed, thereby preparing an oil layer mixture.

Next, a mixed aqueous solution of an 80 mass % aqueous solution of DAA (400 g), AAM (79 g), N,N'-methylenebisacrylamide (0.023 g) as a crosslinking agent, and water (167 g) was added to the oil layer mixture and emulsified by stirring with a homogenizer. This was adjusted to 50° C. under stirring, and nitrogen gas was bubbled for 30 minutes. Under the stream of the nitrogen gas, a 4 mass % toluene solution of 2,2'-azobis(2-methylpropionamidine) dihydrochloride (1.0 g) was added thereto as a polymerization initiator, and the mixed aqueous solution was polymerized at 45° C. to 55° C. for eight hours, thereby obtaining a W/O emulsion-type polymer (polymer concentration: 42.5 mass %).

The polymer concentration was determined as follows.

The W/O emulsion-type polymer (approximately 10 g) was put into a beaker and weighed, then, acetone as much as 10 mass times or more the W/O emulsion-type polymer was added to precipitate the polymer, and a supernatant was removed. Again, acetone was added to remove the supernatant, this operation was repeated a total of three times to purify the polymer, and then the polymer was dried at room temperature (25° C.) for 48 hours with a vacuum dryer, thereby obtaining a powder-form polymer.

The obtained powder-form polymer was weighed, the ratio of the mass of the powder-form powder to the mass of the W/O emulsion-type polymer measured in the beginning was calculated, and this value was defined as the polymer concentration [mass %].

Synthesis Examples 2 to 14

Individual W/O emulsion-type polymers were obtained in the same manner as in Synthesis Example 1 except that, in Synthesis Example 1, the constituent monomers, the crosslinking agent, and the polymerization initiator that were used as the synthesis raw materials were changed as shown in individual synthesis examples in Table 1.

TABLE 1

| Synthesis Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Constituent monomer [g] (mol % for values in parentheses) | | | | | | | | | | | | | | |
| DAA (80 mass % aqueous solution) | 400 (60) | 400 (60) | 400 (60) | 400 (60) | 430 (80) | 318 (40) | 381 (90) | — | — | 318 (40) | 400 (60) | 381 (90) | 400 (60) | 400 (60) |
| DAM-1 (80 mass % aqueous solution) | — | — | — | — | — | — | — | 408 (60) | — | — | — | — | — | — |

TABLE 1-continued

| Synthesis Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| DAM-2 (80 mass % aqueous solution) | — | — | — | — | — | — | — | — | 430 (60) | — | — | — | — | — |
| AAM | 79 (40) | 79 (40) | 79 (40) | 79 (40) | 31.5 (20) | 139 (60) | 12.4 (10) | 75 (40) | 65 (40) | 139 (60) | 79 (40) | 9.5 (10) | 79 (40) | 79 (40) |
| Crosslinking agent [g] (mass ppm for values in parentheses (vs. total mass of constituent monomers)) | | | | | | | | | | | | | | |
| N,N'-methylene-bisacrylamide | 0.023 (58) | 0.013 (33) | — | — | 0.01 (27) | 0.015 (38) | 0.01 (32) | 0.017 (42) | 0.01 (24) | 0.001 (2.5) | 0.001 (2.5) | — | 0.03 (75) | 0.05 (125) |
| Triallylamine | — | — | 0.1 (250) | — | — | — | — | — | — | — | — | 0.01 (32) | — | — |
| Ethoxylated isocyanurate triacrylate | — | — | — | 0.01 (25) | — | — | — | — | — | — | — | — | — | — |
| Polymerization initiator (4 mass % toluene solution) | | | | | | | | | | | | | | |
| 2,2'-Azobis (2-methyl-propionamidine) dihydrochloride | 1.0 | 1.0 | — | 1.0 | 1.0 | 1.0 | 1.0 | 1.0 | 1.0 | 1.0 | 1.0 | 1.0 | 1.0 | 1.0 |
| 2,2'-Azobis (2,4-dimethyl-valeronitrile) | — | — | 1.0 | — | — | — | — | — | — | — | — | — | — | — |
| Polymer concentration [mass %] | 42.5 | 42.7 | 41.8 | 42.5 | 41.8 | 42.0 | 36.8 | 42.5 | 41.8 | 41.8 | 42.8 | 37.1 | 42.3 | 42.1 |

Commercially Available Products 1 to 3

As commercially available W/O emulsion-type polymers, "KURIFIX (registered trademark)" series manufactured by Kurita Water Industries Ltd. were used. The compositions of constituent monomers were as shown in Table 2, respectively.

<Intrinsic Viscosity>

For each polymer, the intrinsic viscosity was determined according to the following order (i) to (vi).

(i) Five Cannon-Fenske viscometers (No. 75 manufactured by Kusano Science Co., Ltd.) were immersed in a glassware neutral detergent for one day or longer, sufficiently washed with water, and dried.

(ii) The W/O emulsion-type polymer was diluted with water to prepare an aqueous solution having a polymer concentration of 0.2 mass %. The polymer concentrations of the commercially available products were in accordance with the catalog values.

(iii) A 2-mol/L aqueous sodium nitrate solution (50 mL) was added to the aqueous solution having a polymer concentration of 0.2 mass % (50 mL) prepared in the (ii) and stirred with a magnetic stirrer at 500 rpm for 20 minutes, thereby obtaining a 1-mol/L aqueous sodium nitrate solution having a polymer concentration of 0.1 mass %. This was diluted with a 1-mol/L aqueous sodium nitrate solution to prepare polymer solution specimens having five different polymer concentrations of 0.02, 0.04, 0.06, 0.08, and 0.1 mass %. A 1-mol/L aqueous sodium nitrate solution to which no polymer was added was defined as a blank liquid.

(iv) The five viscometers prepared in (i) were vertically installed in a constant-temperature tank adjusted to a temperature of 30° C. (within ±0.02° C.). The blank liquid (10 mL) was put into the individual viscometers with a hole pipette and then left to stand for approximately 30 minutes in order to make the temperatures constant. After that, the liquid was suctioned using a dropper plug and naturally dropped, and the time taken for the liquid to pass through a marked line was measured with a stopwatch in the unit of up to 1/100 second. This measurement was repeated five times for each viscometer, and the average value thereof was defined as the blank value (t₀).

(v) The polymer solution specimens having five different polymer concentrations prepared in the (iii) (10 mL) were put into the five viscometers with which the blank liquid had been measured, respectively, and left to stand for approximately 30 minutes in order to make the temperatures constant. After that, the same operation as the measurement of the blank liquid was repeated three times, and the average value of the passing times for each concentration was defined as the measurement value (t).

The relative viscosity $\eta_{rel}$, the specific viscosity $\eta_{sp}$, and the reduced viscosity $\eta_{sp}/C$ [dL/g] were determined from the blank value $t_0$, the measurement value t, and the concentration [mass/vol %] (=C [g/dL]) of the polymer solution specimen in accordance with relational formulae shown in formulae (III) and (IV).

$$\eta_{rel}=t/t_0 \quad (III)$$

$$\eta_{sp}=(t-t_0)/t_0="\eta_{rel}-1 \quad (IV)$$

From these values, the intrinsic viscosity [η] of each polymer was determined according to the method for determining the intrinsic viscosity based on the Huggins equation.

(vi) In (iii), the concentration of the aqueous sodium nitrate solution was changed, and a 0.01-mol/L aqueous sodium nitrate solution having a polymer concentration of 0.1 mass % was prepared. This was diluted with a 0.01-mol/L aqueous sodium nitrate solution to prepare polymer solution specimens having five different polymer concentrations in the same manner as in (iii), and the intrinsic viscosity [η] of each polymer was determined according to the order (iii) to (v).

k Value

The intrinsic viscosity of the 1-mol/L aqueous sodium nitrate solution at 30° C. determined by the above-described measurement of the intrinsic viscosity is represented by $[\eta]_1$ [dL/g], and the intrinsic viscosity of the 0.01-mol/L aqueous sodium nitrate solution at 30° C. is represented by $[\eta]_{0.01}$ [dL/g]. For each polymer, the value k was calculated from these $[\eta]_1$ and $[\eta]_{0.01}$ values in accordance with formula (I).

$$k=([\eta]_{0.01}-[\eta]_1)/9 \qquad (I)$$

The intrinsic viscosities $[\eta]_1$ and $[\eta]_{0.01}$ and the k value of each polymer are summarized in Table 2.

TABLE 2

| Specimen | Polymer | Constituent monomer (mol %) | Intrinsic viscosity [dL/g] | | k value |
|---|---|---|---|---|---|
| | | | $[\eta]_1$ | $[\eta]_{0.01}$ | |
| 1 | Synthesis Example 1 | DAA (60)/AAM (40) | 2.5 | 11.4 | 1.0 |
| 2 | Synthesis Example 2 | DAA (60)/AAM (40) | 3.4 | 17.7 | 1.6 |
| 3 | Synthesis Example 3 | DAA (60)/AAM (40) | 3.8 | 20.0 | 1.9 |
| 4 | Synthesis Example 4 | DAA (60)/AAM (40) | 3.1 | 13.3 | 1.2 |
| 5 | Synthesis Example 5 | DAA (80)/AAM (20) | 2.5 | 14.7 | 1.3 |
| 6 | Synthesis Example 6 | DAA (40)/AAM (60) | 1.8 | 10.8 | 1.0 |
| 7 | Synthesis Example 7 | DAA (90)/AAM (10) | 2.5 | 13.8 | 1.3 |
| 8 | Synthesis Example 8 | DAM-1 (60)/AAM (40) | 4.8 | 22.8 | 2.0 |
| 9 | Synthesis Example 9 | DAM-2 (60)/AAM (40) | 2.8 | 12.3 | 1.1 |
| 10 | Synthesis Example 10 | DAA (40)/AAM (60) | 8.5 | 28.5 | 2.2 |
| 11 | Synthesis Example 11 | DAA (60)/AAM (40) | 3.8 | 23.6 | 2.2 |
| 12 | Synthesis Example 12 | DAA (90)/AAM (10) | 7.3 | 27.6 | 2.3 |
| 13 | Synthesis Example 13 | DAA (60)/AAM (40) | 1.7 | 9.1 | 0.8 |
| 14 | Synthesis Example 14 | DAA (60)/AAM (40) | 0.8 | 5.3 | 0.5 |
| 15 | Commercially available product 1 | DAA (80)/AAM (20) | 7.3 | 32.9 | 2.9 |
| 16 | Commercially available product 2 | DAA (40)/AAM (50)/AA (10) | 6.6 | 26.4 | 2.3 |
| 17 | Commercially available product 3 | DAA (60)/AAM (40) | 4.9 | 28.6 | 2.7 |

Sludge

The details of sludge that was used in the evaluation tests of the sludge dehydrating agent specimens are shown in Table 3. The abbreviation and analysis method (in accordance with the sewage water testing method) of each item that indicates a nature of the sludge shown in Table 3 are as follows.

(1) SS

The sludge (100 mL) was weighed and then centrifuged at 3000 rpm for 10 minutes to remove a supernatant. The sediment was poured into a crucible, the weight of which had been measured, while being washed with water, dried at a temperature within a range of 105° C. to 110° C. for 15 hours, and then weighed, thereby determining the mass of the residue in the crucible after the drying.

The proportion of the mass of the residue in the mass of the sludge (100 mL) before the drying was regarded as the content [mass %] of suspended solids (SS) in the sludge (100 mL).

(2) VSS

After the mass of the residue (SS) in the crucible in the (1) was determined, the residue (SS) was ignited in a state of being contained in the crucible at a temperature within a range of 600±25° C. for two hours, left to stand, and then weighed, thereby determining the mass of the residue in the crucible after the ignition.

The difference in mass between the residue (SS) in the crucible before the ignition and the residue in the crucible after the ignition is the mass of volatile suspended solids (VSS) in the sludge (100 mL). The proportion of the mass of the residue (VSS) after the ignition in the mass of the SS was determined as the content rate [mass %/SS] of the VSS.

(3) TS

The sludge (100 mL) was weighed, put into a crucible, the weight of which had been measured, dried at a temperature within a range of 105° C. to 110° C. for 15 hours, and then weighed, thereby determining the mass of the residue in the crucible after the drying.

The proportion of the mass of the residue in the mass of the sludge (100 mL) before the drying was determined as the content rate [mass %] of the evaporated residue (TS: total solids) in the sludge (100 mL).

(4) VTS

After the mass of the residue (TS) in the crucible was determined in the (3), the residue (TS) was ignited in a state of being contained in the crucible at a temperature within a range of 600±25° C. for two hours, left to stand, and then weighed, thereby determining the mass of the residue in the crucible after the ignition.

The difference in mass between the residue (TS) in the crucible before the ignition and the residue in the crucible after the ignition is the mass of volatile total solids (VTS) in the sludge (100 mL). The proportion of the mass of the residue (VTS) after the ignition in the mass of the TS was determined as the content rate [mass %/TS] of the VTS.

(5) Fiber Component

The sediment (100 mL) was filtered with a sieve with 100 meshes (sieve openings: 149 μm), the residue on the sieve was poured into a crucible, the weight of which had been measured, while being washed with water, dried at a temperature within a range of 105° C. to 110° C. for 15 hours, and then weighed, thereby determining the mass of the residue in the crucible after the drying.

After that, the residue was ignited in a state of being contained in the crucible at a temperature within a range of 600±25° C. for two hours, left to stand, and then weighed, thereby determining the mass of the residue in the crucible after the ignition.

The difference in mass between the residue in the crucible before the ignition and the residue in the crucible after the ignition is the mass of volatile total solids having grain sizes of approximately 149 μm or larger in the sludge (100 mL) and is mainly the mass of a volatile fiber component. The proportion of the mass of the residue (the volatile total solids having grain sizes of approximately 149 μm or larger) after the ignition in the mass of the SS was determined as the content rate [mass %/SS] of the fiber component.

(6) pH

The pH was measured in accordance with JIS Z 8802: 2011 and based on the operation of the glass electrode method. For the proofreading of the pH, commercially available pH standard solutions for phthalate, neutral phosphate, and carbonate, respectively, were used.

(7) Electrical Conductivity

The electrical conductivity was measured in accordance with JIS K 0102: 2016.

TABLE 3

| Sludge | A<br>Excess sludge<br>from chemical<br>factories | B<br>Excess sludge<br>from food<br>factories | C<br>Mixed sludge<br>from night soil<br>treatment plants |
|---|---|---|---|
| SS [mass %] | 0.6 | 0.9 | 0.8 |
| VSS [mass %/SS] | 87.1 | 90.5 | 61.7 |
| TS [mass %] | 0.7 | 1.0 | 0.9 |
| VTS [mass %/TS] | 73.0 | 85.8 | 60.1 |
| Fiber component [mass %/SS] | 0.3 | 1.2 | 7.7 |
| pH | 7.4 | 6.7 | 6.2 |
| Electrical conductivity [mS/m] | 217 | 147 | 43.7 |

Evaluation Tests of Sludge Dehydrating Agent Specimens

A desk test of a sludge treatment was performed using the sludge dehydrating agent specimens for which the polymers prepared above were used, and the sludge dehydration performances of the sludge dehydrating agent specimens were evaluated by the following evaluation methods.

Example 1

The W/O emulsion-type polymer obtained in Synthesis Example 1 was diluted with water to prepare an aqueous solution having a polymer concentration of 0.2 mass %, and this aqueous solution was defined as a sludge dehydrating agent specimen 1.

The sludge A (200 mL) was collected in a 300 mL beaker, the sludge dehydrating agent specimen 1 was added thereto such that the concentration of the sludge dehydrating agent specimen 1 added became 110 mg/L and stirred at 180 rpm for 30 seconds to form flocculated flocs, thereby obtaining treated sludge.

Examples 2 to 11 and Comparative Examples 1 to 8

Various types of treated sludge were obtained by adding the sludge dehydrating agent specimens to various types of sludge and forming flocculated flocs in the same manner as in Example 1 except that, in Example 1, the sludge, the sludge dehydrating agent specimen, and the concentration of the sludge dehydrating agent specimen 1 added were changed as shown in Table 4.

Evaluation Methods

For various types of the treated sludge in the examples and the comparative example, individual items described below were evaluated. The evaluation results thereof are summarized in Table 4.

(1) Floc Diameter

Among the flocculated flocs in the beaker, for approximately 100 arbitrary flocculated flocs that were observable from above the beaker, the maximum diameters of the individual flocculated flocs were measured with a measuring instrument, and the average value thereof was defined as the floc diameter.

The floc diameter is an index of the floc-forming power of the sludge dehydrating agent. As the floc diameter becomes larger, it is possible to evaluate that coarser flocculated flocs are formed, and the floc-forming power of the sludge dehydrating agent can be said to be stronger. However, in a case where the floc diameter is too large, there is a tendency that a cake water content rate described below becomes high. The floc diameter is preferably 4.5 mm or larger.

(2) 20-Second Filtration Amount

A Buchner funnel (inner diameter: 80 mm, hole diameter: approximately 1 mm) was installed on a 200 mL measuring cylinder, and then a polyvinyl chloride tube having a diameter of 50 mm was installed on the upper side of a filtration surface of the Buchner funnel. The treated sludge was poured into the tube at once, a filtrate generated for 20 seconds from the beginning of the pouring was collected with the measuring cylinder, and the amount of the filtrate read from the scales of the measuring cylinder was defined as a 20-second filtration amount.

The 20-second filtration amount is an index of gravity filterability. As the 20-second filtration amount becomes larger, it is possible to evaluate that flocculated flocs having better gravity filterability are formed. However, even when the 20-second filtration amount is large, if an SS leak amount described below is large, it cannot be said that the treated sludge is dehydrated in a favorable state, and there is a need to collectively determine the 20-second filtration amount and the SS leak amount in the evaluation of the sludge dehydration performance of the sludge dehydrating agent specimen.

(3) SS Leak Amount

After the measurement of the 20-second filtration amount in the (2), furthermore, the measuring cylinder was replaced by another measuring cylinder after 40 seconds, and the amount of a liquid that had passed through the hole of the Buchner funnel after 60 seconds from the beginning of the pouring of the treated sludge and been collected was read from the scales of the measuring cylinder. This read liquid amount was defined as the SS leak amount.

The SS leak amount mentioned herein is a numerical value that serves as a rough standard for the amount of the suspended solids (SS) such as fine flocs that fail to form coarse flocculated flocs or collapse in the treated sludge.

As the SS leak amount become smaller, it is possible to evaluate that more solid and coarser flocculated flocs are formed.

(4) Cake Water Content Rate

After the measurement of the SS leak amount in the (3), flocculated flocs remaining on the Buchner funnel were packed into a polyvinyl chloride column (inner diameter: 30 mm, height: 17.5 mm). The column was removed, substantially circular massive flocculated flocs having an approximately 30 mm bottom surface were compressed from above at 0.1 MPa for 60 seconds, thereby obtaining dehydrated cake.

The mass of the dehydrated cake and the mass of the dehydrated cake after being dried at 105° C. for 15 hours were measured. The difference between the masses of the dehydrated cake before and after the drying was regarded as the amount of water contained in the dehydrated cake. The proportion of the amount of water contained in the mass of the dehydrated cake before the drying is determined as the cake water content rate [mass %].

When the cake water content rate is 80 mass % or more and less than 88 mass %, it is possible to evaluate that dehydrated cake favorable enough to be handled in the same manner as dehydrated cake obtained by a dehydration treatment with a conventional sludge dehydrating agent is obtained. In addition, the cake water content rate is preferably as low as possible from the viewpoint of the handleability of dehydrated cake in disposal treatments and the like.

In Comparative Examples 1, 3, 5, and 7, the SS leak amounts were too large, and it was difficult to obtain dehydrated cake from which the cake water content rate could be obtained.

TABLE 4

| | | | Sludge dehydrating agent (polymer) | | | | |
|---|---|---|---|---|---|---|---|
| | Sludge | Specimen | k value | Concentration of sludge dehydrating agent added [mg/L] | Floc diameter [mm] | 20-second filtration amount [mL] | SS leak amount [mL] | Cake water content rate [mass %] |
| Example 1 | A | 1 | 1.0 | 110 | 6 | 172 | 5 | 87.0 |
| Example 2 | | 2 | 1.6 | 110 | 8 | 170 | 0 | 86.8 |
| Example 3 | | 3 | 1.9 | 110 | 9 | 170 | 5 | 87.6 |
| Example 4 | | 4 | 1.2 | 110 | 8 | 176 | 15 | 86.8 |
| Comparative Example 1 | | 11 | 2.2 | 110 | 8 | 165 | 80 | — |
| Comparative Example 2 | | 13 | 0.8 | 110 | 5 | 160 | 20 | 88.0 |
| Comparative Example 3 | | 14 | 0.5 | 110 | 4 | 160 | 30 | — |
| Comparative Example 4 | | 17 | 2.7 | 110 | 11 | 158 | 0 | 88.3 |
| Example 5 | B | 2 | 1.6 | 60 | 8 | 142 | 0 | 83.3 |
| Example 6 | | 5 | 1.3 | 60 | 7 | 144 | 0 | 83.4 |
| Example 7 | | 7 | 1.3 | 60 | 8 | 144 | 0 | 83.3 |
| Example 8 | | 9 | 1.1 | 60 | 6 | 144 | 0 | 83.8 |
| Comparative Example 5 | | 12 | 2.3 | 60 | 7 | 110 | 40 | — |
| Comparative Example 6 | | 15 | 2.9 | 60 | 10 | 140 | 0 | 84.0 |
| Example 9 | C | 2 | 1.6 | 90 | 11 | 166 | 5 | 83.5 |
| Example 10 | | 6 | 1.0 | 90 | 10 | 164 | 0 | 83.9 |
| Example 11 | | 8 | 2.0 | 90 | 8 | 162 | 0 | 83.1 |
| Comparative Example 7 | | 10 | 2.2 | 90 | 7 | 142 | 30 | — |
| Comparative Example 8 | | 16 | 2.3 | 90 | 12 | 168 | 0 | 84.2 |

As is clear from the results shown in Table 4, according to the sludge dehydrating agent of the present invention containing a polymer having a k value within a predetermined range, the floc diameter, the 20-second filtration amount, the SS leak amount, and the cake water content rate of the treated sludge were all favorable. That is, it was confirmed that the sludge dehydrating agent of the present invention is excellent in terms of sludge dehydration performance.

The invention claimed is:

1. A sludge dehydrating agent with a polymer which has a constituent unit derived from a cationic monomer, wherein a value k determined from an intrinsic viscosity $[\eta]_1$ [dL/g] of a 1-mol/L aqueous sodium nitrate solution of the polymer at 30° C. and an intrinsic viscosity $[\eta]_{0.01}$ [dL/g] of a 0.01-mol/L aqueous sodium nitrate solution of the polymer at 30° C. in accordance with formula (I) is 0.8 to 2.2 exclusive, $$k=([\eta]_{0.01}-[\eta]_1)/9 \quad (I),$$

wherein the intrinsic viscosity $[\eta]1$ is 1.0 to 6.5 dL/g, and the intrinsic viscosity $[\eta]0.01$ is 8.5 to 26.0 dL/g, wherein the sludge dehydrating agent contains a polymer having the K value, wherein the k value is adopted as a parameter based on an intrinsic viscosity of the polymer which correlates with a degree of spread or contraction of a polymer chain.

2. The sludge dehydrating agent according to claim 1, wherein the polymer is a crosslinking polymer of a cationic monomer represented by formula (1) or a crosslinking copolymer of the cationic monomer represented by formula (1) and a non-ionic monomer, and a proportion of the cationic monomer is 30 mol % or more in a total of 100 mol % of monomers that serve as constituent units of the polymer,

[Chem. 1]

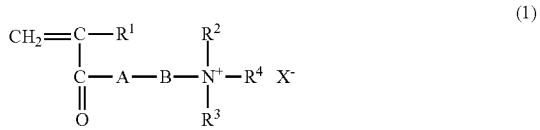

(in formula (1), $R^1$ is a hydrogen atom or a methyl group, $R^2$ and $R^3$ are each independently a hydrogen atom or an alkyl group having 1 to 3 carbon atoms, $R^4$ is a hydrogen atom, an alkyl group having 1 to 3 carbon atoms, or a benzyl group, A is an oxygen atom or an imino group, B is an alkylene group having 2 to 4 carbon atoms, and X is a negative ion).

3. The sludge dehydrating agent according to claim 1, wherein the polymer is a water-in-oil emulsion.

4. A sludge dehydration method, wherein sludge is dehydrated by adding the sludge dehydrating agent according to claim 1 to the sludge.

* * * * *